(12) United States Patent
Yokoyama

(10) Patent No.: US 12,353,459 B2
(45) Date of Patent: Jul. 8, 2025

(54) INFORMATION PROCESSING APPARATUS AND NON- TRANSITORY COMPUTER READABLE MEDIUM

(71) Applicant: FUJIFILM BUSINESS INNOVATION CORP., Tokyo (JP)

(72) Inventor: Toshiharu Yokoyama, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 518 days.

(21) Appl. No.: 17/318,302

(22) Filed: May 12, 2021

(65) Prior Publication Data
US 2022/0107971 A1    Apr. 7, 2022

(30) Foreign Application Priority Data

Oct. 1, 2020   (JP) .................................. 2020-167340

(51) Int. Cl.
*G06F 16/335*   (2019.01)
*G06F 16/332*   (2025.01)
*G06F 16/3332*  (2025.01)

(52) U.S. Cl.
CPC ........ *G06F 16/335* (2019.01); *G06F 16/3326* (2019.01); *G06F 16/3334* (2019.01); *G06F 16/3335* (2019.01)

(58) Field of Classification Search
CPC ....... H04L 51/08; H04L 51/216; G06F 16/93; G06F 16/2246; G06F 40/137; G06F 40/14

See application file for complete search history.

(56) References Cited

U.S. PATENT DOCUMENTS

| | | | |
|---|---|---|---|
| 10,242,003 B2* | 3/2019 | Mishne ................... | G06F 16/93 |
| 2003/0041112 A1* | 2/2003 | Tada ..................... | G06Q 10/107 |
| | | | 707/999.01 |
| 2008/0263193 A1* | 10/2008 | Chalemin ............... | H04L 67/02 |
| | | | 709/224 |
| 2014/0067929 A1* | 3/2014 | Kirigin ................... | H04L 67/06 |
| | | | 709/204 |
| 2016/0308967 A1* | 10/2016 | Zhang ................... | G06Q 10/101 |
| 2019/0228055 A1 | 7/2019 | Watanabe | |

FOREIGN PATENT DOCUMENTS

| | | |
|---|---|---|
| JP | 2003-067306 A | 3/2003 |
| JP | 2019-128689 A | 8/2019 |

* cited by examiner

*Primary Examiner* — Ken Hoang
(74) *Attorney, Agent, or Firm* — Oliff PLC

(57) ABSTRACT

An information processing apparatus includes: a processor configured to: acquire a message for another person that a requester has input when requesting the other person to register a document in a specific storage location of a storage device; if the other person registers the document, which the requester has requested to register, in the storage location, associate at least one element of the message with the registered document; and upon receiving a search for a document with a search term from the requester, search for and output a document associated with an element, including the search term, of the at least one element of the message.

20 Claims, 12 Drawing Sheets

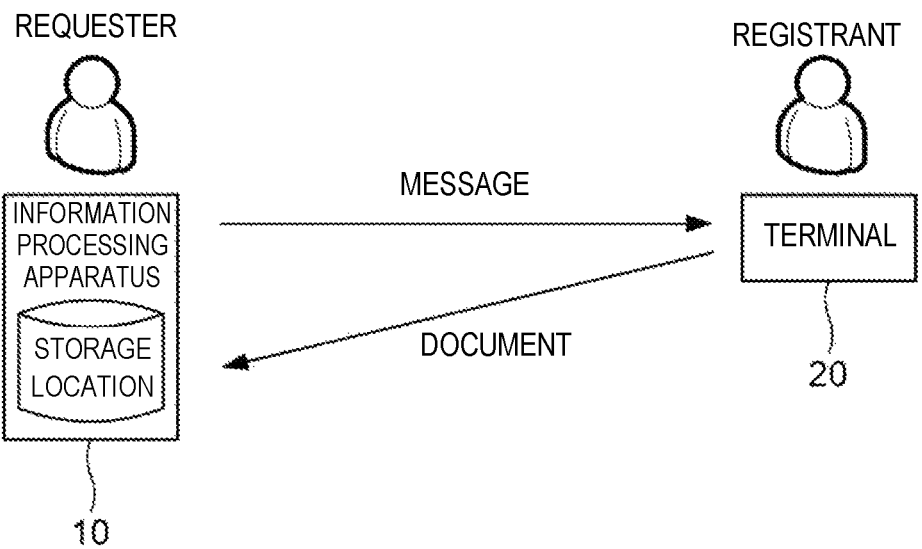
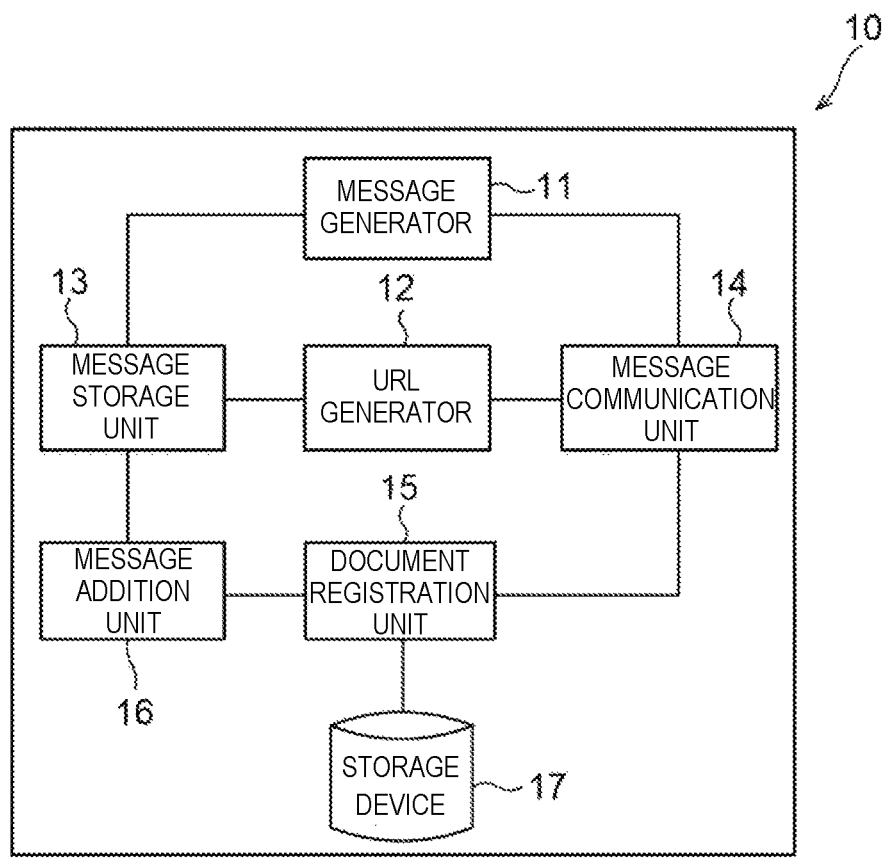

FIG. 6

| REGISTRATION DESTINATION | MESSAGE | REGISTRANT |
|---|---|---|
| https://host/ABCDEFG | PLEASE REGISTER QUOTATION RESULT HERE. | A@kaisya-A.com |
| https://host/HIJKLMN | PLEASE REGISTER QUOTATION RESULT HERE. | B@kaisya-B.com |

FIG. 7
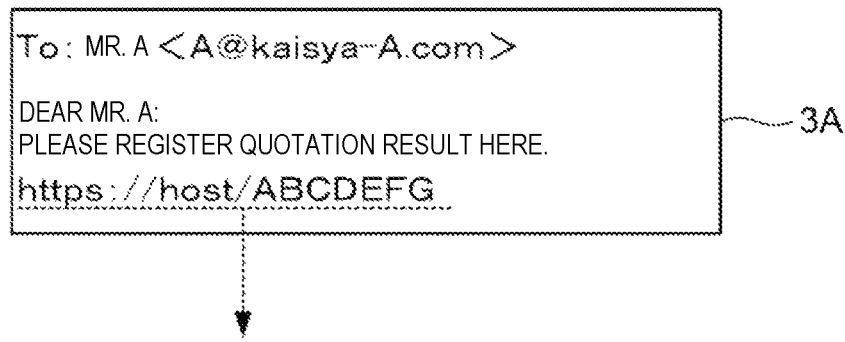
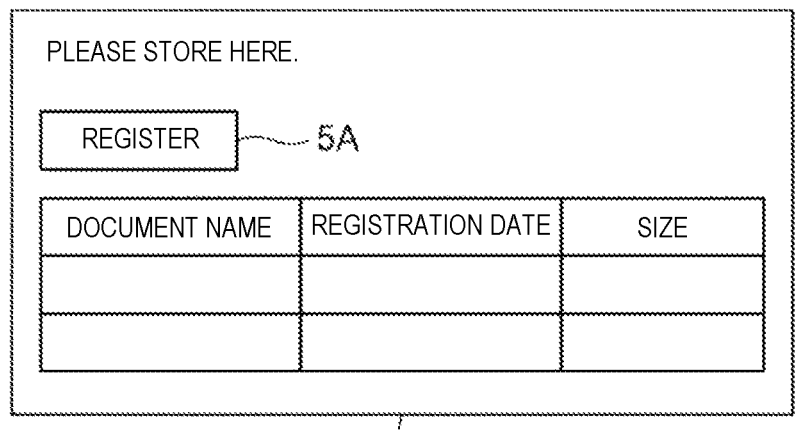
FIG. 8
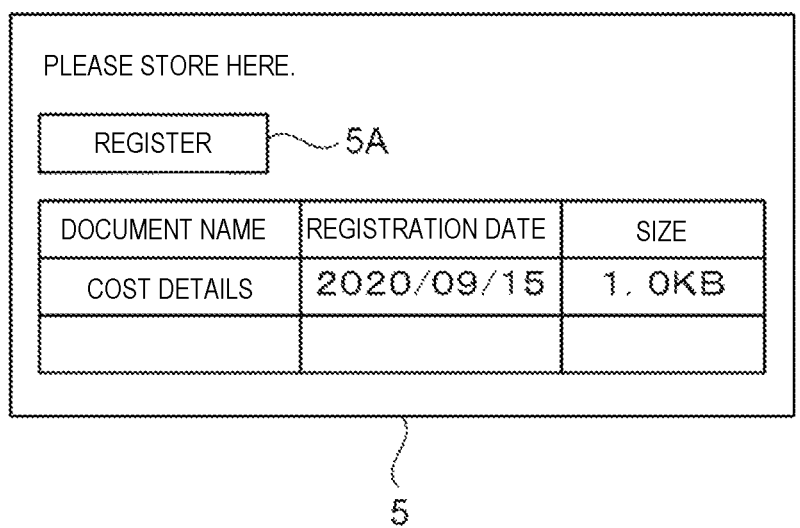

FIG. 10

| REGISTRANT | DOCUMENT NAME | MESSAGE |
|---|---|---|
| A@kaisya-A.com | COST DETAILS | PLEASE REGISTER QUOTATION RESULT HERE. |
| B@kaisya-B.com | LEDGER SHEET | PLEASE REGISTER QUOTATION RESULT HERE. |

FIG. 11

| DOCUMENT NAME | REGISTRANT | SIZE |
|---|---|---|
| COST DETAILS | A@kaisya-A.com | 1.0KB |
| LEDGER SHEET | B@kaisya-B.com | 0.9MB |
| : | : | : |

QUOTATION — 7A    7B — SEARCH

| REGISTRATION DESTINATION | MESSAGE | REGISTRANT |
|---|---|---|
| https://host/ABCDEFG | QUOTATION, RESULT, REGISTER | A@kaisya-A.com |
| https://host/HIJKLMN | QUOTATION, RESULT, REGISTER | B@kaisya-B.com |

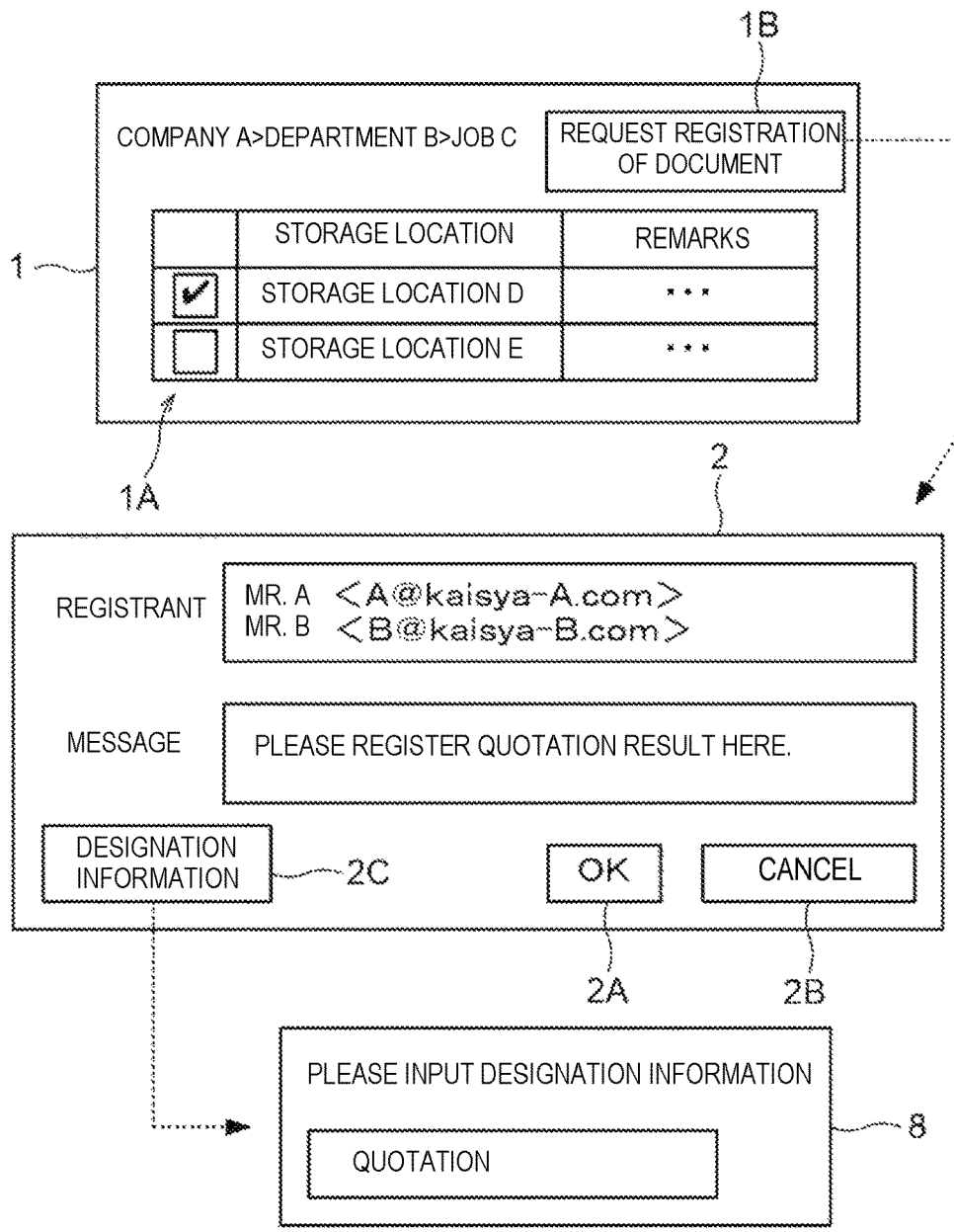

| REGISTRANT | DOCUMENT NAME | DESIGNATION INFORMATION |
|---|---|---|
| A@kaisya-A.com | COST DETAILS | QUOTATION |
| B@kaisya-B.com | LEDGER SHEET | QUOTATION | ns # INFORMATION PROCESSING APPARATUS AND NON- TRANSITORY COMPUTER READABLE MEDIUM

CROSS-REFERENCE TO RELATED APPLICATIONS

This application is based on and claims priority under 35 USC 119 from Japanese Patent Application No. 2020-167340 filed Oct. 1, 2020.

BACKGROUND (i) Technical Column

The present disclosure relates to an information processing apparatus and a non-transitory computer readable medium.

(ii) Related Art

JP-A-2003-067306 describes a method for accumulating and managing e-mail including: an e-mail accumulation step of accumulating one or more pieces of e-mail data that are transmitted and received via an e-mail server as a series of e-mail history; a package insert extraction step of extracting a part or all of the package inserts attached to the e-mail data accumulated in the e-mail accumulation step; and a document management information generation step of generating management information regarding the package inserts extracted by the package insert extraction step for one or more pieces of e-mail data included in the e-mail history generated by the e-mail accumulation step.

JP-A-2019-128689 describes an information processing apparatus including: a generation unit that generates correspondence information between messages by using the history of communication performed by associating a document with a message among plural users; an extraction unit that extracts a difference when the document is updated; and a presentation unit that searches for the difference from the correspondence information and presents a message based on the search result in the correspondence information.

SUMMARY

There is an information processing apparatus having a document management function of receiving a document that a requester has requested another person from the other person via a document storage location.

Aspects of non-limiting embodiments of the present disclosure relate to an information processing apparatus and a non-transitory computer readable medium that, when a requester requested another person to register a document in a storage location and later tries to search for a document which was received from the other person in response to the request, can search for the received document using a message that was created by the requester him/herself when making the request.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a processor configured to: acquire a message for another person that a requester has input when requesting the other person to register a document in a specific storage location of a storage device; if the other person registers the document, which the requester has requested to register, in the storage location, associate at least one element of the message with the registered document; and upon receiving a search for a document with a search term from the requester, search for and output a document associated with an element, including the search term, of the at least one element of the message.

BRIEF DESCRIPTION OF THE DRAWINGS

Exemplary embodiment(s) of the present disclosure will be described in detail based on the following figures, wherein:

FIG. 1 is a diagram illustrating an example of collecting documents using an information processing apparatus;

FIG. 2 is a diagram illustrating a functional configuration example of the information processing apparatus;

FIG. 6 is a diagram illustrating an example of storage information;

FIG. 7 is a diagram illustrating an example of a registration operation;

FIG. 8 is a diagram illustrating an example of a registration screen;

FIG. 10 is a diagram illustrating an example of registration information;

FIG. 11 is a diagram illustrating an example of a search screen;

FIG. 12 is a diagram illustrating an example of the storage information;

FIG. 14 is a diagram illustrating an example of a document registration request in the modification of the registration requesting process;

FIG. 15 is a diagram illustrating an example of the storage information in the modification of the registration requesting process;

DETAILED DESCRIPTION

Figure 3:
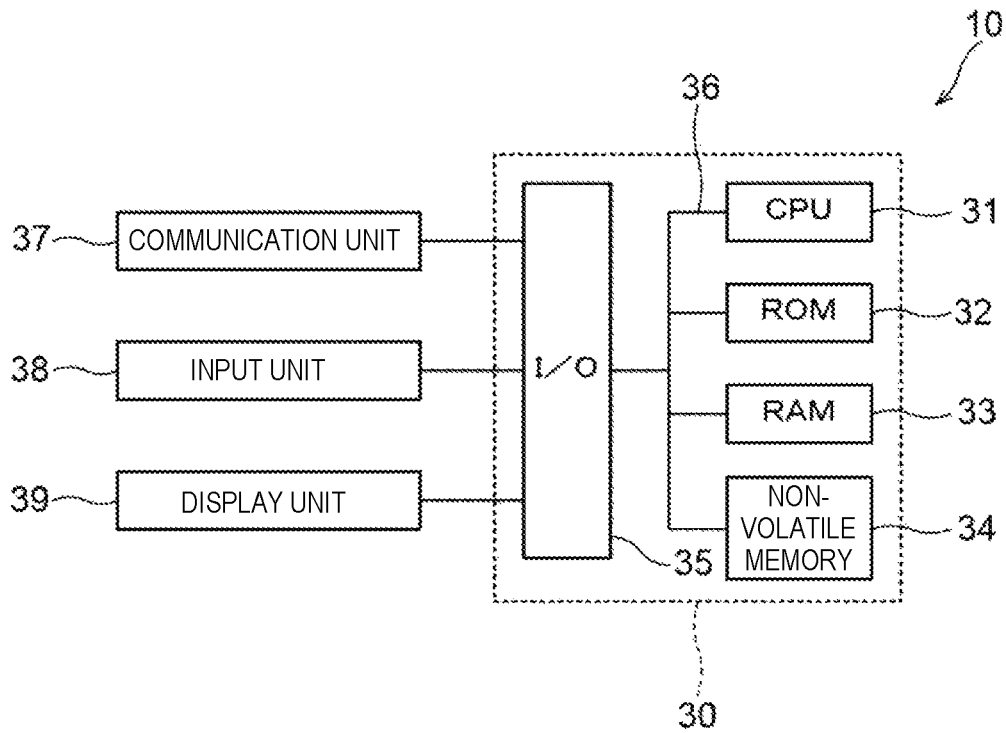
FIG. 3 is a diagram illustrating a configuration example of a part of an electric system of the information processing apparatus.

Hereinafter, exemplary embodiments will be described with reference to the accompanying drawings. The same elements and the same processes are given the same reference numerals throughout the drawings, and duplicate description thereof will be omitted.

FIG. 1 is a diagram illustrating an example of collecting documents using an information processing apparatus 10 according to the present exemplary embodiment. In accordance with an instruction of a requester who requests a document, the information processing apparatus 10 transmits a message to a terminal 20 used by a registrant (who is an example of another person designated by the requester). Meanwhile, upon receipt of the message, the registrant registers the document instructed by the message in a storage location designated by the requester. Then, the requester searches documents registered in the storage location for a document according to a purpose, and views the document.

As described above, the information processing apparatus 10 has a collecting function of collecting documents from the registrant designated by the requester. Types of documents collected by the information processing apparatus 10 are not particularly limited. For example, the information processing apparatus 10 is used to collect tasks such as various questionnaires, quotations, and homework.

FIG. 2 is a diagram illustrating an example of a functional configuration of the information processing apparatus 10. The information processing apparatus 10 includes functional units such as a message generator 11, a uniform resource locator (URL) generator 12, a message storage unit 13, a message communication unit 14, a document registration unit 15, and a message addition unit 16, and a storage device 17.

The message generator 11 generates a message to be transmitted to the registrant when requesting the registrant to register a document in a specific storage location.

The message is freely input by the requester. The message is not necessarily a sentence. The message may be an enumeration of words reminiscent of the content of a document that is requested for the registration, for example, "Quotation!". Expression used in the message is not particularly limited. Consider a case in which the requester requests the registrant to register a quotation for a product. In this case, a message that conveys the intention to request for the registration of the quotation to the registrant (such as "Please register a quotation result." or "Please send me a quotation for the product") is often input in addition to the message "Quotation!". As described above, types of the document that the requester requests the registrant to register through the message is not particularly limited.

The URL generator 12 generates URL information indicating a registration destination in which the registrant is requested to register the document. It is not necessary to designate the storage device 17 in the information processing apparatus 10 as a document registration destination. An apparatus other than the information processing apparatus 10 may be designated as the registration destination. In the following, description will be made on an example in which the storage device 17 in the information processing apparatus 10 is designated as the document registration destination.

The message storage unit 13 associates the message generated by the message generator 11, the URL information generated by the URL generator 12, and registrant information for identifying the registrant who has been requested to register the document with each other, and temporarily stores information indicating such association until the registrant registers the requested document.

The message communication unit 14 transmits the message generated by the message generator 11 and the URL information generated by the URL generator 12 to the terminal 20 used by the registrant represented by the registrant information. For example, in a case of transmission via a communication line such as the Internet or a local area network (LAN), a technique that the message communication unit 14 uses to transmit the message and the URL information is not particularly limited. For example, the message communication unit 14 may transmit the message and the URL information using chat, an e-mail, or a social networking service (SNS). When the transmission form is an e-mail, an e-mail address is used as the registrant information. When the transmission form is chat or SNS, identification information called an account, a handle name, and an ID defined for each chat or SNS is used as the registrant information.

Upon the registrant performing an operation of registering the document requested by the requester in the storage location represented by the URL information, the message communication unit 14 receives a document from the terminal 20 of the registrant, and passes the received document to the document registration unit 15.

The document registration unit 15 registers the document received from the message communication unit 14 in the storage location represented by the URL information in the storage device 17. Storing a document in a designated storage area in this way will be referred to as "registration (register)".

Further, the document registration unit 15 notifies the message addition unit 16 that the registrant has registered the document.

Upon the registrant registering the document, which the requester has requested for registration, in the storage location represented by the URL information, the message addition unit 16 associates elements of the message used for requesting the registrant to register the document with the registered document.

The phrase "elements of a message" refers to a subset of the message. That is, in addition to words and phrases that constitute the message, the entire message is also an example of the elements of the message. Each morpheme obtained by performing morphological analysis on the message is also an example of the elements of the message. Further, an original form obtained by converting the extracted morpheme is also an example of the elements of the message.

In the above, the example has been described in which after the document is registered in the storage location represented by the URL information in the storage device 17, the message addition unit 16 associates the element of the message with the document. Alternatively, the message addition unit 16 may associate the element of the message with the document before being registered by the document registration unit 15 in the storage location represented by the URL information.

Upon receipt of any of a word, a phrase, and a sentence from the requester as a keyword that is an example of a search term used in document search, the information processing apparatus 10 searches documents registered in the storage device 17 for a document associated with an element of a message including the keyword, and outputs the search result to the requester. The term "output" according to the present exemplary embodiment refers to making the search result recognizable to the requester. The term "output" includes (i) displaying the search result, (ii) forming the search result on a recording medium such as a sheet of paper, (iii) notifying the search result by voice, and (iv) transmitting the search result to an device other than the information processing apparatus 10 and the terminal 20 (hereinafter, which will be referred to as an "external device") via a communication line. In the following, description will be made on an example in which the information processing apparatus 10 displays the search result on a display.

The number of registrants who are requested to register a document from the information processing apparatus 10 at a time is not particularly limited. One registrant may be requested to register a document. Or, plural registrants may be collectively requested to register a document using a common message.

Such an information processing apparatus 10 is implemented by, for example, a computer 30.

FIG. 3 is a diagram illustrating a configuration example of a part of an electric system of the information processing apparatus 10 when the information processing apparatus 10 is implemented by the computer 30.

The computer 30 includes a central processing unit (CPU) 31 (an example of a processor) that handles processes of respective functional units of the information processing apparatus 10 illustrated in FIG. 2, a read only memory (ROM) 32 that stores an information processing program, a random access memory (RAM) 33 used as a temporary work area of the CPU 31, a non-volatile memory 34, and an input/output interface (I/O) 35. The CPU 31, ROM 32, RAM 33, non-volatile memory 34, and I/O 35 are each connected to each other via a bus 36.

The non-volatile memory 34 is an example of a storage device 17 that maintains to store information even if power supplied to the non-volatile memory 34 is cut off. For example, a semiconductor memory is used, but a hard disk may be used. The non-volatile memory 34 is not necessarily built in the computer 30. The non-volatile memory 34 may be a storage device (such as a memory card) that is detachably attached to the computer 30. The non-volatile memory 34 is an example of the storage device 17. For example, a document is registered in the non-volatile memory 34.

For example, a communication unit 37, an input unit 38, and a display unit 39 are connected to the I/O 35.

The communication unit 37 is connected to a communication line. The communication unit 37 includes a communication protocol for communicating with the terminal 20 and an external device. The communication line may be a wired line, a wireless line, or a line in which a wired line and a wireless line are mixed.

The input unit 38 is a device that receives an instruction from the requester and notifies the CPU 31 of the instruction. For example, a button, a touch panel, a keyboard, a pointing device, and a mouse are used.

The display unit 39 is a device that displays information processed by the CPU 31. For example, a liquid crystal display, an organic electroluminescence (EL) display, or a display device such as a projector that projects an image onto a screen are used.

The information processing apparatus 10 may connect various necessary units to the I/O 35 depending on a situation. For example, the information processing apparatus 10 may connect an image forming unit that forms an image on a recording medium such as a sheet of paper, to the I/O 35.

Next, an operation of the information processing apparatus 10 will be described in detail.

Figure 4:
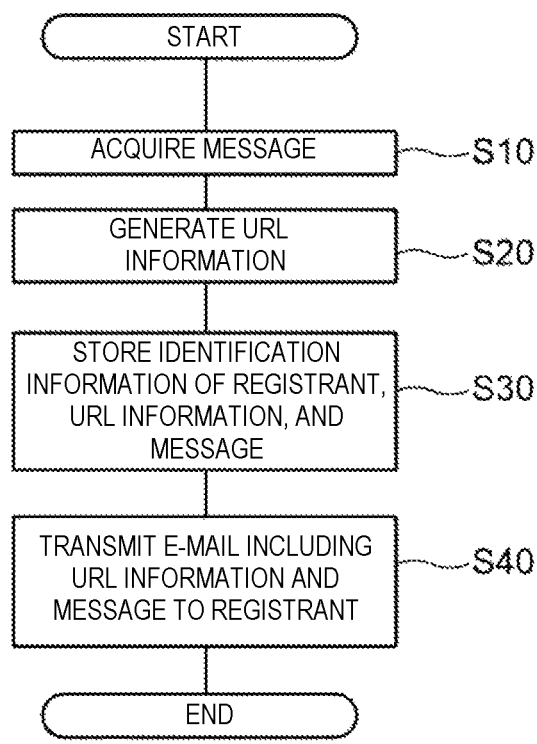
FIG. 4 is a flowchart illustrating an example of a registration requesting process.

FIG. 4 is a flowchart illustrating an example of a registration requesting process executed by the CPU 31 upon the information processing apparatus 10 receiving a document registration request from a requester. The information processing program that defines the registration requesting process is stored in advance in, for example, the ROM 32 of the information processing apparatus 10. The CPU 31 of the information processing apparatus 10 reads the information processing program stored in the ROM 32 and executes the registration requesting process.

In the following, description will be made on an example in which a request is made to a registrant using an e-mail to register a document, and a request is collectively made to plural registrants using a common message to register a document.

In step S10, the CPU 31 acquires a message from the requester.

Figure 5:
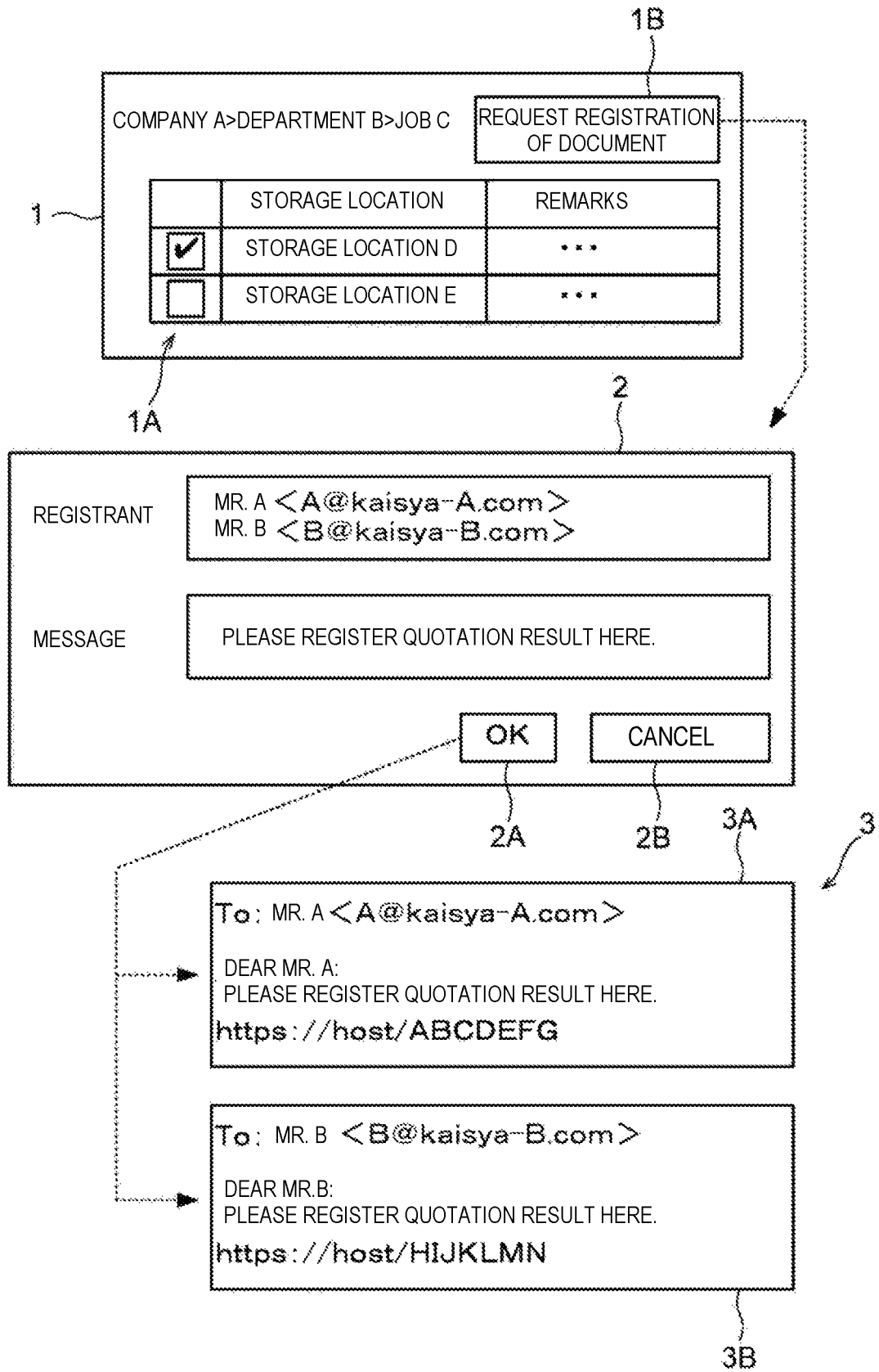
FIG. 5 is a diagram illustrating an example of requesting registration of a document.

FIG. 5 is a diagram illustrating an example of a document registration request made by the requester.

Upon the requester requesting the registration of the document, the CPU 31 displays a registration request screen 1 on the display unit 39. The registration request screen 1 includes, for example, a storage location field, a remarks field, a check box 1A, and a document registration request button 1B. In the storage location field, at least one storage location that is a candidate for registration destination of the document is displayed. In the remarks field, information about a corresponding storage location (for example, a free space of the storage location) and a comment about the storage location (such as an intended use of the storage location, for example, "for quotation") are displayed.

Upon the requester setting a check mark in any one of the check boxes 1A with a mouse, the CPU 31 recognizes the storage location corresponding to the check box 1A in which the check mark is set as a storage location in which a document which will be requested from now is to be registered.

Then, when the requester presses the document registration request button 1B with the mouse, the CPU 31 displays a message input screen 2 on the display unit 39.

The message input screen 2 includes, for example, a registrant field, a message field, an OK button 2A, and a cancel button 2B. In the registrant field, a registrant who is a request destination for document registration is designated. In the message field, the requester inputs a message.

When the requester inputs e-mail addresses of the registrants in the registrant field, inputs a message in the message field, and then presses the OK button 2A, the CPU 31 acquires the entire message input in the message field as a message to be collectively transmitted to the registrants.

In step S20 of FIG. 4, the CPU 31 generates URL information of the storage location corresponding to the check box 1A, in which the check mark has been set, on the registration request screen 1.

The storage location of each document that the plural registrants are requested to register in the same registration requesting process is a common storage location corresponding to the check box 1A in which the check mark has been set. However, the CPU 31 does not give each registrant access right to the entire storage location, but generates URL information respectively representing areas which are dedicated to the registrants and which are obtained by logically dividing a common storage location, such that each registrant cannot view documents registered by other registrants.

Therefore, for example, when e-mail addresses of two registrants "A" and "B" are set in the registrant field of the message input screen 2, the CPU 31 generates URL information "http://host/ABCDEFG" for the registrant A and generates URL information "http://host/HIJKLMN" for the registrant B, which is different from that for registrant A.

As a result, since the security of the documents between the registrants is ensured, the information processing apparatus 10 is also used for collecting documents whose information is not to be leaked to other registrants, such as a request for competitive quotations to plural registrants.

Further, when the requester presses the cancel button 2B on the message input screen 2, the CPU 31 displays the registration request screen 1 again on the display unit 39 and causes the requester to start over from the selection of the storage location.

In step S30 of FIG. 4, the CPU 31 stores identification information of the registrants, the URL information, and information associated with the message (that is, storage information 4) in the non-volatile memory 34.

FIG. 6 is a diagram illustrating an example of the storage information 4. As illustrated in FIG. 6, in the storage information 4, the message acquired from the message input screen 2 in step S10 is associated with the URL information generated in step S20 for the identification information of each registrant (in this case, the e-mail address of each registrant) who is a request destination for document registration. In the example of the storage information 4 illustrated in FIG. 6, the CPU 31 sets the entire message in the storage information 4 as an element of the message.

In step S40 of FIG. 4, the CPU 31 generates an e-mail for each registrant represented by the e-mail address input in the registrant field of the message input screen 2 of FIG. 5, and transmits the generated e-mail to the terminal 20 used by each registrant.

In the example of the document registration request illustrated in FIG. 5, the e-mail addresses of the two registrants (that is, the registrant A and the registrant B) are set in the registrant field. Therefore, the CPU 31 transmits an e-mail 3A to the registrant A and transmits an e-mail 3B to the registrant B. Hereinafter, when it is not necessary to distinguish the e-mails to be transmitted to the respective registrants, such e-mails will be collectively referred to as "e-mails 3".

The e-mail 3 includes an e-mail address of a registrant set as a destination of the e-mail 3, the message acquired from the message input screen 2 in step S10, and the URL information generated in step S20. Therefore, the e-mail 3A illustrated in FIG. 5 includes a text that "Dear Mr. A: Please register the quotation result here. https://host/ABCDEFG", and the e-mail 3B includes a text that "Dear Mr. B: Please register the quotation result here. https://host/HIJKLMN". The CPU 31 may set a hyperlink in the URL information such that a page for registering the document is displayed on the terminal 20 in response to the registrant pressing a character string representing the URL information with the mouse.

Accordingly, the registration requesting process illustrated in FIG. 4 ends.

Meanwhile, when the registration requesting process ends, the terminal 20 of each registrant receives the e-mail 3 from the information processing apparatus 10. Each registrant performs a registration operation of registering the requested document according to the content of the received e-mail 3.

FIG. 7 is a diagram illustrating an example of the registration operation performed by the registrant A. When a hyperlink is set in the URL information included in the e-mail 3A, a registration screen 5 is displayed on the terminal 20 in response to the registrant A pressing the URL information with the mouse.

Upon the registrant A selecting a document to be registered and pressing a registration button 5A, the selected document and the identification information of the registrant who has performed the registration operation (in this case, the e-mail address of the registrant A) are transmitted from the terminal 20 to the information processing apparatus 10. As a result, the selected document is registered in the storage location represented by the URL information.

Information about the registered document as illustrated in FIG. 8 is displayed on the registration screen 5 after the registration operation has been performed. In the example of FIG. 8, a document name, a registration date, and a size of the registered document are displayed.

Figure 9:
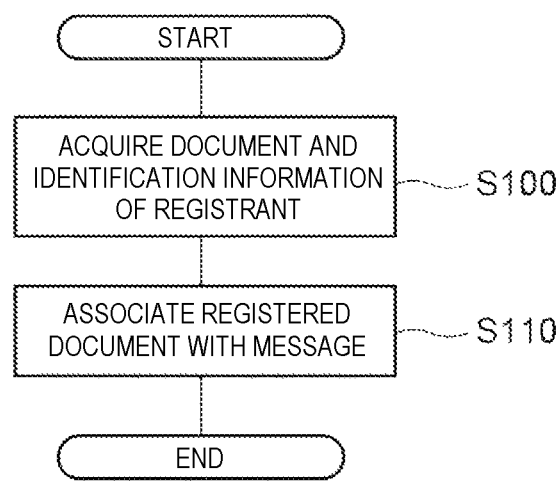
FIG. 9 is a flowchart illustrating an example of a registration process.

FIG. 9 is a flowchart illustrating an example of a registration process executed by the CPU 31 of the information processing apparatus 10 when a document is received from the terminal 20 of the registrant. An information processing program that defines the registration process is stored in advance in, for example, the ROM 32 of the information processing apparatus 10. The CPU 31 of the information processing apparatus 10 reads the information processing program stored in the ROM 32 and executes the registration process.

In step S100, the CPU 31 acquires the document received from the terminal 20 and the identification information of the registrant received together with the document. The CPU 31 refers to the storage information 4 (see, for example, FIG. 6) stored in the non-volatile memory 34 in step S30 of FIG. 4, and registers the received document in the storage area represented by the URL information associated with the identification information of the registrant received together with the document.

In step S110, the CPU 31 refers to the storage information 4 and associates the document registered in step S100 with registration information 6 including the element of the message.

FIG. 10 is a diagram illustrating an example of the registration information 6. As illustrated in FIG. 10, the registration information 6 includes the identification information of the registrant, the document name of the registered document, and the element of the message, for each registered document. As for the element of the message in the registration information 6, the element of the message stored in the storage information 4 corresponding to the registrant of the document is set as it is.

In step S30 of FIG. 4, the entire message acquired from the message input screen 2 is stored in the storage information 4 as the element of the message. Therefore, the registered document is associated with the entire message that the requester has inputted in the message field of the message input screen 2. It is needless to say that the registration information 6 illustrated in FIG. 6 is a mere example and may include other information such as the registration date of the document. When documents are registered by plural registrants, the registration information 6 is associated with each registered document.

Accordingly, the registration process illustrated in FIG. 9 ends.

When the requester tries to confirm the content of the registered document later, the requester may not remember the type of the registered document or the storage location well, and it is also possible that the registered document has been moved from the original storage location to another storage location. Therefore, the requester may search for a target document from a search screen 7 using a keyword that seems to be related to the target document.

FIG. 11 is a diagram illustrating an example of the search screen 7 in which the requester searches for a document. The search screen 7 includes an input field 7A in which the requester inputs a keyword, a search button 7B, and a search result display field 7C. When the requester inputs a keyword in the input field 7A and presses the search button 7B with the mouse, the CPU 31 searches for, for example, a document including the keyword and a document associated with the registration information 6 including the keyword in the element of the message, and displays the search result in the display field 7C. The CPU 31 may also search for only the document associated with the registration information 6 including the keyword in the element of the message.

The message input on the message input screen 2 when the requester requested the registration of the document is a sentence created by the requester him/herself. Therefore, it is more memorable to the requester than sentences created by other persons. Originally, the document name of the registered document and the text contained in the document were freely created by others unless otherwise specified by the requester. Therefore, it is less burdensome for the requester to think of keywords based on the message created by the requester him/herself, rather than thinking of keywords that are likely to be included in the document name or text created by others and that are likely to be related to the registered document.

Further, when requesting the registrant to register a document, the requester attaches a message to the e-mail 3. Since the document can be searched for with this message, it is not necessary to have the requester input an additional search message different from the message. That is, from the perspective of the requester, he/she has input information for document search during the operation of requesting the registrant to register the document.

In this way, when the requester requests the registrant to register a document, the document is associated with the message that the requester has input on the message input screen 2 and the message associated with the registered document is included in objects to be searched, so that it becomes easier to search for a target document as compared to a case where only contents of registered documents are searched using a keyword.

Furthermore, even when the requester has moved the documents registered in the storage location represented by the URL information to another storage location different from the storage location, since the registration information 6 is not the storage location but the information associated with each of the registered documents, the CPU 31 does not change the content of the registration information 6 in response to the storage location being changed. Therefore, the same registration information 6 is associated with the registered document even at the changed storage location. That is, the CPU 31 may search for a document with a keyword based on a message regardless of the storage location of the document.

Further, in a case of a search method in which the CPU 31 performs a partial match search with a message, it is easier for the search to hit when the message is stored as the entire message than when a word or a phrase of the message is stored. Therefore, the entire message may be associated with the registered document as described in the above example.

However, when the entire message is associated with the registered document, a time taken to make the search increases as the number of registered documents increases, and the search efficiency tends to decrease. As the amount of information to be searched increases, it is likely to find a document that is not intended.

Therefore, the CPU 31 may use a search method in which each of words or phrases in the message is indexed and the search is performed based on the index. In the case of such a search method, the CPU 31 may divide the message into words or phrases by a known parsing technique, regard the words or phrases as elements of the message, and associate the words or phrases with the registered document.

Specifically, in step S30 of FIG. 4, when the storage information 4 is stored in the non-volatile memory 34, the CPU 31 may divide the message acquired from the message input screen 2 in step S10 of FIG. 4 into words or phrases by a known parsing technique, and set the words or phrases extracted from the message in the message field of the storage information 4 illustrated in FIG. 6.

For example, when the message input on the message input screen 2 is "Please register the quotation result here.", words "quotation", "result", and "register" are stored in the storage information 4 as illustrated in FIG. 12. Therefore, in step S110 of FIG. 9, the CPU 31 associates the registered document with the elements of the message such as "quotation", "result", and "register". As a result, the amount of information to be searched is reduced as compared to a case in which the entire message is associated with the registered document.

The CPU 31 may extract proper nouns (such as personal names and place names) included in the message, and dates, times, and numerical values by using a known named entity extraction technique, and associate them with the registered document.

The CPU 31 determines whether the elements of the message is (i) the entire message or (ii) the words or phrases included in the message, according to a form designated by the requester, and then, associates the elements of the message with the registered document.

Further, when associating the words or phrases included in the message with the registered document, in step S110 of FIG. 9, the CPU 31 may display the words or phrases which are stored in the storage information 4 and which correspond to the registered document on the display unit 39, so as to allow the requester to select an item that is to be associated with the registered document from the displayed words or phrases.

That is, the CPU 31 may not directly associate all the elements of the message, which are extracted from the message with the registered document by using the known morphological analysis or parsing technique, may associate only an element of the message selected by the requester with the registered document.

Modifications of Exemplary Embodiment

In the above, descriptions have been made on the example of the information processing apparatus 10 that associates the message that the requester has input on the message input screen 2 with the registered document. Alternatively, the requester him/herself may input a message to be associated with the registered document separately from the message attached to the e-mail 3.

Figure 13:
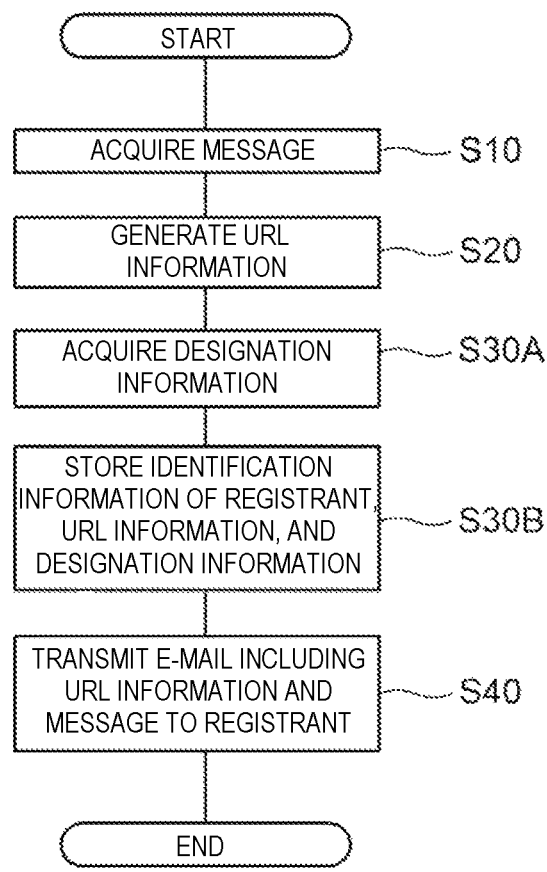
FIG. 13 is a flowchart illustrating an example of the registration requesting process according to a modification.

FIG. 13 is a flowchart illustrating an example of a registration requesting process according to a modification executed by the CPU 31 upon the information processing apparatus 10 receiving a document registration request from a requester.

The registration requesting process according to the modification illustrated in FIG. 13 is different from the registration requesting process illustrated in FIG. 4 in that step S30 is replaced with steps S30A and S30B, and the other processes are the same as those in FIG. 4. Therefore, here, the registration requesting process according to the modification illustrated in FIG. 13 will be described with a focus on steps S30A and S30B.

When the URL information of the storage location of the document for which registration is requested is generated in step S20, step S30A is executed.

In step S30A, the CPU 31 acquires designation information from the requester. The designation information is a message for search to be associated with the registered document. The message for search has been input separately from the message input by the requester in the message field of the message input screen 2.

FIG. 14 is a diagram illustrating an example of a document registration request by the requester. In the message input screen 2 illustrated in FIG. 14, a designation information button 2C is added to the message input screen 2 illustrated in FIG. 5.

In response to the requester pressing the designation information button 2C with the mouse, the CPU 31 displays a designation information input screen 8 on the display unit 39. The requester inputs designation information on the designation information input screen 8. In the example of FIG. 14, "quotation" is input as the designation information. The CPU 31 acquires the designation information via the designation information input screen 8.

In step S30B, the CPU 31 stores, in the non-volatile memory 34, storage information 4 in which the identification information of the registrant, the URL information, and the designation information acquired in step S30A are associated with each other.

FIG. 15 is a diagram illustrating an example of the storage information 4 stored in the non-volatile memory 34 in step S30B. As illustrated in FIG. 15, in the storage information 4 of FIG. 15, the URL information generated in step S20 and the designation information acquired from the designation information input screen 8 in step S30A are associated with the identification information of each registrant (in this case, the e-mail address of each registrant) who is requested to register a document.

Figures 16, 17:
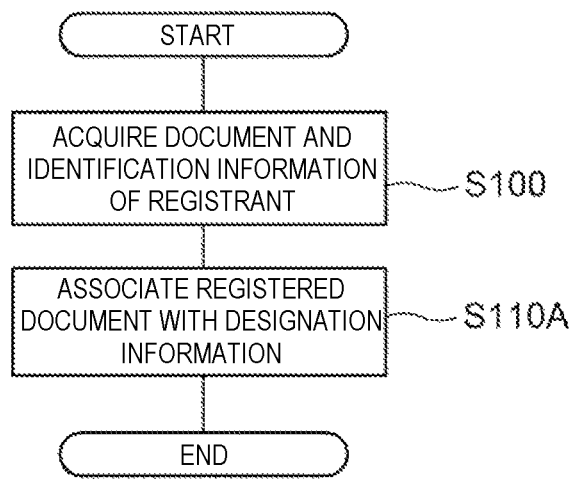
FIG. 16 is a flowchart illustrating an example of a registration process corresponding to the registration requesting process according to the modification.
FIG. 17 is a diagram illustrating an example of registration information in the modification of the registration requesting process.

FIG. 16 is a flowchart illustrating an example of a registration process corresponding to the registration requesting process according to the modification illustrated in FIG. 13. The CPU 31 executes the registration process in FIG. 16 upon receiving a document from the terminal 20 of the registrant.

The registration process illustrated in FIG. 16 is different from the registration process illustrated in FIG. 9 in that step S110 is replaced with step S110A, and the other processes are the same as those in FIG. 9. Therefore, here, the registration process illustrated in FIG. 16 will be described with a focus on step S110A.

When registering the document received from the terminal 20 in step S100 in the storage area represented by the URL information, the CPU 31 executes step S110A.

In step S110A, the CPU 31 refers to the storage information 4 illustrated in FIG. 15 and associates the registration information 6 including the designation information with the document registered in step S100.

FIG. 17 is a diagram illustrating an example of the registration information 6. In this case, the message input by the requester on the message input screen 2 is not stored in the storage information 4 illustrated in FIG. 15, but the designation information is stored instead. Therefore, the designation information is associated with the registered document instead of the message.

Therefore, if the requester inputs the designation information, which has been input in the designation information input screen 8, in the input field 7A of the search screen 7 illustrated in FIG. 11, the document associated with the designation information is searched for.

The information processing apparatus 10 has been described above using the exemplary embodiment. The information processing apparatus 10 of the exemplary embodiment is a mere example and is not to be construed in any limiting sense. The information processing apparatus 10 is not limited to the exemplary embodiment described above. Various changes or modifications may be made to the exemplary embodiment without departing from the gist of the present disclosure. The changed or modified forms are also included in the technical scope of the present disclosure.

Further, in the above-described exemplary embodiment, the registration requesting process and the registration process implemented by software have been described as an example. It is noted that the same processes as those in the flowcharts illustrated in FIGS. 4, 9, 13, and 16 may be implemented by hardware. In this case, the processing speed may be increased as compared to the case in which the registration requesting process and the registration process are implemented by software.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the above exemplary embodiment, the description has been made on the example in which the information processing program is stored in the ROM 32 of the information processing apparatus 10. It is noted that the storage location of the information processing program is not limited to the ROM 32. The information processing program of the present disclosure may also be provided in such a form of being recorded on a storage medium readable by the computer 30. For example, the information processing program may be provided in the form of being recorded on an optical disc such as a compact disk read only memory (CD-ROM) and a digital versatile disk read only memory (DVD-ROM). The information processing program may be provided in a form of being recorded in a portable semiconductor memory such as a universal serial bus (USB) memory and a memory card. The ROM 32, non-volatile memory 34, CD-ROM, DVD-ROM, USB, and memory card are examples of non-transitory storage media.

The information processing apparatus 10 may download an information processing program from an external device through the communication unit 37 and store the downloaded information processing program in, for example, the non-volatile memory 34. In this case, the CPU 31 of the information processing apparatus 10 reads the information processing program downloaded from the external device and executes the registration requesting process and the registration process.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
acquire a message for a registrant that is input by a requester who is different from the registrant, the message requesting the registrant to register a document in a specific storage location of a storage device, the message including a link to the specific storage location of the storage device;
upon display of the message to the registrant and selection of the link by the registrant, acquire information of the document to be registered from the registrant;
upon determining that the registrant registers the document as requested in the message from the requester, associate at least one element of the message with the registered document, the at least one element of the message including a part of the message that was input by the requester before the document was uploaded via the link; and
upon receiving a search request for a document with a search term that includes the part of the message, display the document as a search result even when the information of the document acquired from the registrant does not include the part of the message, and even when the document is moved to a different storage location from the specific storage location associated with the link.

2. The information processing apparatus according to claim 1, wherein
the processor is configured to:
if the requester collectively requests a plurality of registrants to register respective documents using the message commonly sent to the plurality of the registrants, associate the at least one element of the common message with each of the respective documents which the plurality of registrants have respectively registered using the link.

3. The information processing apparatus according to claim 2, wherein
the processor is configured to register each of the respective documents, which have been collectively requested to be registered using the common message including the link, in the specific storage location.

4. The information processing apparatus according to claim 2, wherein
the processor is configured to, even if the requester has moved one or more of the respective documents registered in the specific storage location to another storage location, not change the at least one element of the common message associated with the one or more of the respective documents.

5. The information processing apparatus according to claim 1, wherein
the link associated with the specific storage location does not change in the message input by the requester, even when the document is moved to the different storage location from the specific storage location associated with the link.

6. The information processing apparatus according to claim 1, wherein
the processor is configured to associate the at least one element of the message with the registered document in a form designated by the requester.

7. The information processing apparatus according to claim 2, wherein
the processor is configured to associate the at least one element of the common message with each of the registered documents in a form designated by the requester.

8. The information processing apparatus according to claim 3, wherein
the processor is configured to associate the at least one element of the common message with each of the registered documents in a form designated by the requester.

9. The information processing apparatus according to claim 4, wherein
the processor is configured to associate the at least one element of the common message with each of the registered documents in a form designated by the requester.

10. The information processing apparatus according to claim 5, wherein
the processor is configured to associate the at least one element of the common message with each of the registered documents in a form designated by the requester.

11. The information processing apparatus according to claim 6, wherein
the processor is configured to associate the entire message with the registered document as the at least one element of the message.

12. The information processing apparatus according to claim 7, wherein
the processor is configured to associate the entire common message with each of the registered documents as the at least one element of the message.

13. The information processing apparatus according to claim 8, wherein
the processor is configured to associate the entire common message with each of the registered documents as the at least one element of the message.

14. The information processing apparatus according to claim 9, wherein
the processor is configured to associate the entire common message with each of the registered documents as the at least one element of the message.

15. The information processing apparatus according to claim 10, wherein
the processor is configured to associate the entire common message with each of the registered documents as the at least one element of the message.

16. The information processing apparatus according to claim 6, wherein
the processor is configured to associate a word or phrase extracted from the message with the registered document as the at least one element of the message.

17. The information processing apparatus according to claim 7, wherein
the processor is configured to associate a word or phrase extracted from the common message with each of the registered documents as the at least one element of the message.

18. The information processing apparatus according to claim 6, wherein
the processor is configured to associate an element that the requester has selected from among elements extracted from the message, with the registered document.

19. The information processing apparatus according to claim 1, wherein the processor is configured to associate the document with identification information that identifies the registrant who has registered the document.

20. A non-transitory computer readable medium storing a program that causes a computer to execute information processing, the information processing comprising:

acquiring a message for a registrant that is input by a requester who is different from the registrant, the message requesting the registrant to register a document in a specific storage location of a storage device, the message including a link to the specific storage location of the storage device;

upon display of the message to the registrant and selection of the link by the registrant, acquiring information of the document to be registered from the registrant;

upon determining that the registrant registers the document as requested in the message from the requester, associating at least one element of the message with the registered document, the at least one element of the message including a part of the message that was input by the requester before the document was uploaded via the link; and upon receiving a search request for a document with a search term that includes the part of the message, displaying the document as a search result even when the information of the document acquired from the registrant does not include the part of the message, and even when the document is moved to a different storage location from the specific storage location associated with the link.

* * * * *